United States Patent [19]

Hauser

[11] Patent Number: 5,377,568
[45] Date of Patent: Jan. 3, 1995

[54] DEVICE FOR CONTROLLING THE CUTTING GEOMETRY OF FINE SLICES OBTAINED BY THREAD SAWING

[76] Inventor: Charles Hauser, 1261 Genolier, Chemin Nuyerattes, Switzerland

[21] Appl. No.: 5,971

[22] Filed: Jan. 14, 1993

[30] Foreign Application Priority Data

Jan. 22, 1992 [CH] Switzerland ............... 00170/92-2

[51] Int. Cl.⁶ ........................................... B26D 1/46
[52] U.S. Cl. ........................................ 83/74; 83/170; 83/651.1
[58] Field of Search ............ 83/651.1, 72, 74, 170; 125/12, 21, 16.02

[56] References Cited

U.S. PATENT DOCUMENTS

| | | | |
|---|---|---|---|
| 2,886,026 | 5/1959 | Stewart | 125/12 X |
| 3,186,275 | 6/1965 | Obenshain | 83/170 |
| 3,613,492 | 10/1971 | Soderkvist | 83/170 |
| 3,680,417 | 8/1972 | Wells | 83/74 |
| 4,237,757 | 12/1980 | Bonac | 83/74 |
| 4,653,361 | 3/1987 | Zobelli | 83/74 X |
| 4,763,637 | 8/1988 | Mayer | 125/21 |
| 4,991,475 | 2/1991 | Malcok et al. | 125/13.02 X |
| 5,030,910 | 7/1991 | Junge et al. | 83/72 X |
| 5,099,820 | 3/1992 | Stricot | 125/16.02 |
| 5,113,757 | 5/1992 | Spencer | 83/19 X |
| 5,269,285 | 12/1993 | Toyama et al. | 125/16.02 |

FOREIGN PATENT DOCUMENTS 0282454 9/1988 European Pat. Off. ............. 83/74
0198759 8/1990 Japan ............................. 83/651.1

*Primary Examiner*—Richard K. Seidel
*Assistant Examiner*—Kenneth E. Peterson
*Attorney, Agent, or Firm*—Young & Thompson

[57] ABSTRACT

A thread sawing device comprising a frame carrying thread guide cylinders and having a thread trained about the thread guide cylinders. A support is provided for a part to be sawed, and the thread and support are movable toward and away from each other to saw the part supported by the support. The relative position of the cylinders and the part to be sawed is detected, and responsive to that detection, the temperature of a portion of the device is changed so as to cause that portion to undergo thermal expansion or contraction, so as to maintain the desired relative position constant in a direction transverse to the direction in which the thread and the support move toward and away from each other to saw the part to be sawed. The portion of the device whose temperature is changed is one of the cylinders, or the support. A heat exchange fluid is circulated through that portion and a control for the temperature of the heat exchange fluid is provided, which is a fluid heater and a fluid cooler, and a valve for selectively sending the fluid through either the heater or the cooler.

6 Claims, 3 Drawing Sheets

DEVICE FOR CONTROLLING THE CUTTING GEOMETRY OF FINE SLICES OBTAINED BY THREAD SAWING

The sawing device comprises a frame of threads susceptible to move itself in a continuous or reciprocating motion resting against a part to be sawn definying this way a sawing zone. The sawing zone is constituted of a set of cylinders parallely located.

These cylinders called thread-guides are engraved with grooves which define the interval between the threads of the frame, namely, the thickness of the parts to be sawn. A position detector of the thread-guides controls a compensation device which maintains their spatial position constant towards the part to be sawn.

During the rotation of a mechanical element, the working temperature of said element may not be constant but vary during time depending on the required operation and because of friction and heat generated in the bearings or in the surrounding parts. If the position of this element is critical regarding the work required, not only the proper temperature of the element will be important, but the variations of the framework will also affect its spatial position. These temperature variations thus provoke a thermal dilatation which, in some cases, may influence the result of the operation that should be carried out. It will then be necessary to compensate this dilatation through a control of its position achieved thanks to a compensation system which may be thermal, mechanical, hydraulic, pneumatic or other.

Nevertheless, because of the complexity of the surrounding system, an accurate control of the temperature of the critical element may not be sufficient; a control of the position of the element may then be necessary. This type of control is particularly necessary when the precison of the positioning is high or when the size of the element is large.

Temperature control devices are already known especially in machining workpieces with high precision using robotics in which one uses either a shower or an internal circulation. However these used cooling systems are based on a control of the temperature of the fluid and not on a system using a measurment of the position to regulate the temperature. Such a system may be applied to guiding elements, rotating cylinders, having at least one fixed point, for example a bearing.

Such thread sawing devices of the foresaid type are already known, especially in the field of electronic components, ferrites, quartz and silica to obtain fine slices of materials such as silicon (poly or mono-cristalin) or the new materials such as GaAs, InP, GGG or also quartz, synthetic saphire or ceramic. The high cost of these materials makes the sawing using a thread more attractive compared to other techniques like the sawing with a disc with diamonds.

The precision of the parts to be sawn, very important for electronic applications, depends on the position of the threads during the sawing, thus on the position of the thread-guides toward the parts to be sawn. This position will be a function of the temperature of the thread-guides and the surrounding thereof.

This sawing technique thus requires a perfect control of the position of the thread-guides toward the part to be sawn. In fact, even a slow movement will induce undulations or warping of slices to be cut.

The requirements of electronic applications, for example those bound with the growing dimensions of ingots, require that even small variations must be avoided. It is thus not enough to control only the temperature of an eventual cooling liquid but to control the position of the thread-guides themselves or their temperature. Moreover, the roller bearings supporting heavily loaded thread-guides generate heat, which added to energy produced during the sawing and diffusing into the surrounding part, contributes to the inaccuracy of the cutting.

The aim of the present invention is to remedy the a foresaid drawbacks by giving to the sawing device of the above-mentioned type a system which allows the control of the position of the thread-guides by continuously measuring this position thanks to a detection system which, connected to a compensation device, will maintain the thread-guides in a fixed position.

The sawing device, object of the present invention, comprises thus at least two parts, which are: a unit intended for the control of the thread with a sawing zone and a control and compensation system acting on the position of the thread guide or the part to be sawn.

The accompanying drawings show schematically and by way of example devices according to the invention.

Figure 1:
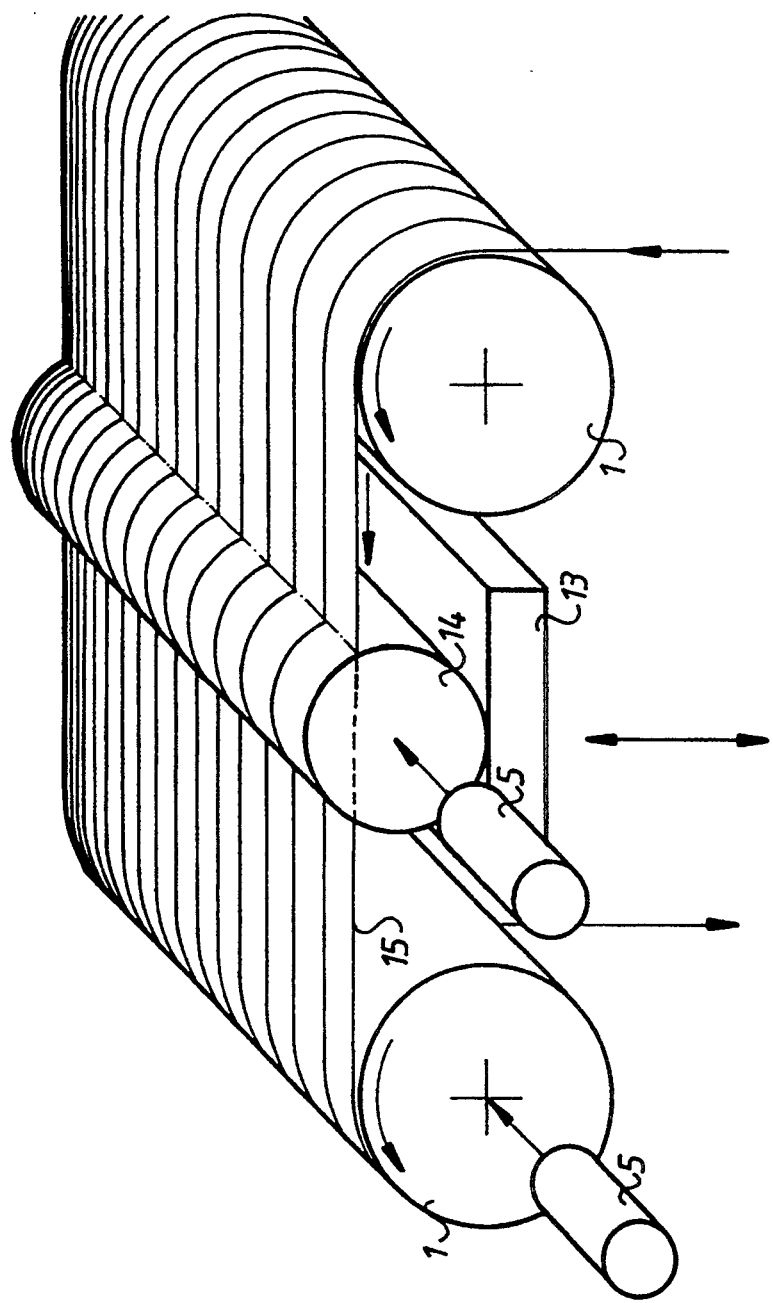
FIG. 1 is a diagrammatic perspective view of apparatus according to the present invention.

Referring now to the drawings in greater detail:

FIG. 1 is a perspective view of the application principle of the present invention. The part to be sawn 14 is propped against the frame of threads 15 by the frame work table 13. The position detector 5 car bear against the part to be sawn 14 or against the free surface of the thread-guides cylinder 1 or it can operate by contactless detection.

Figure 2:
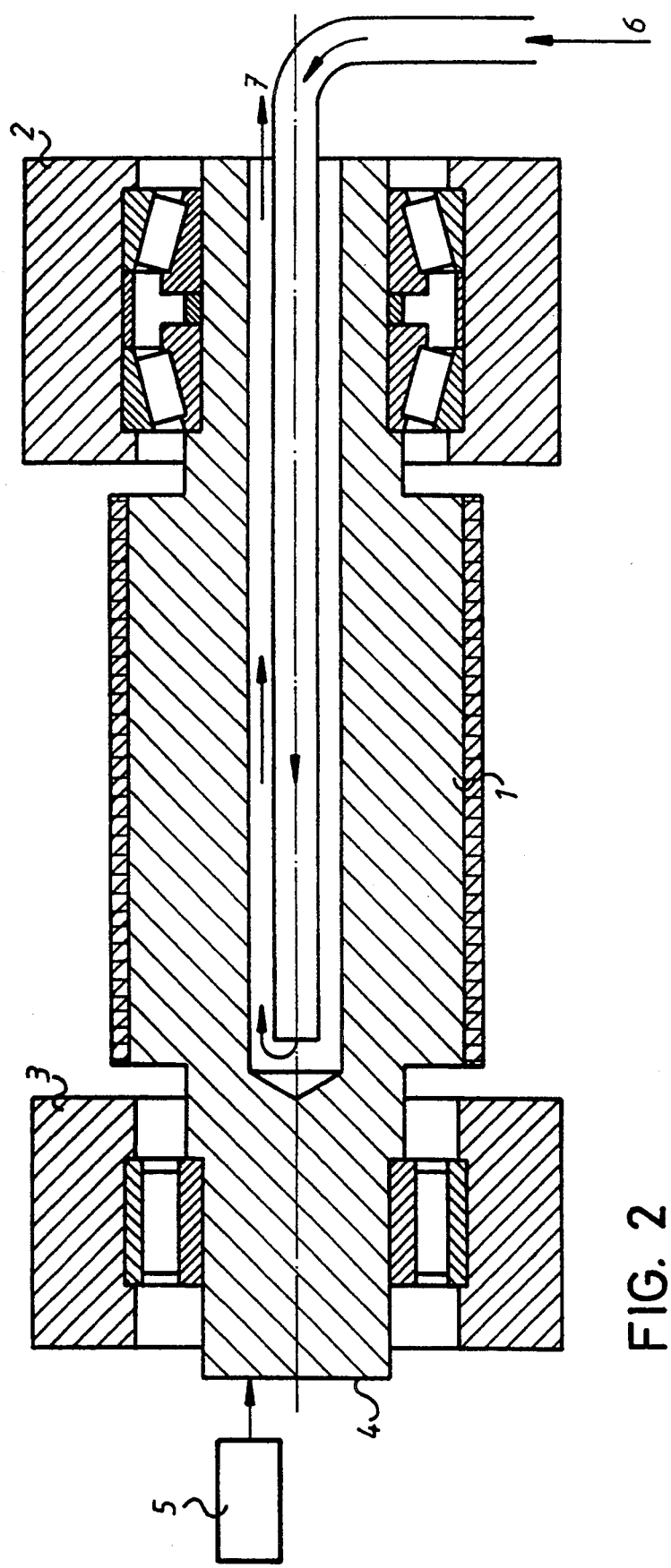
FIG. 2 is a somewhat schematic cross-sectional view of a thread guide cylinder according to the invention.
Figure 3:
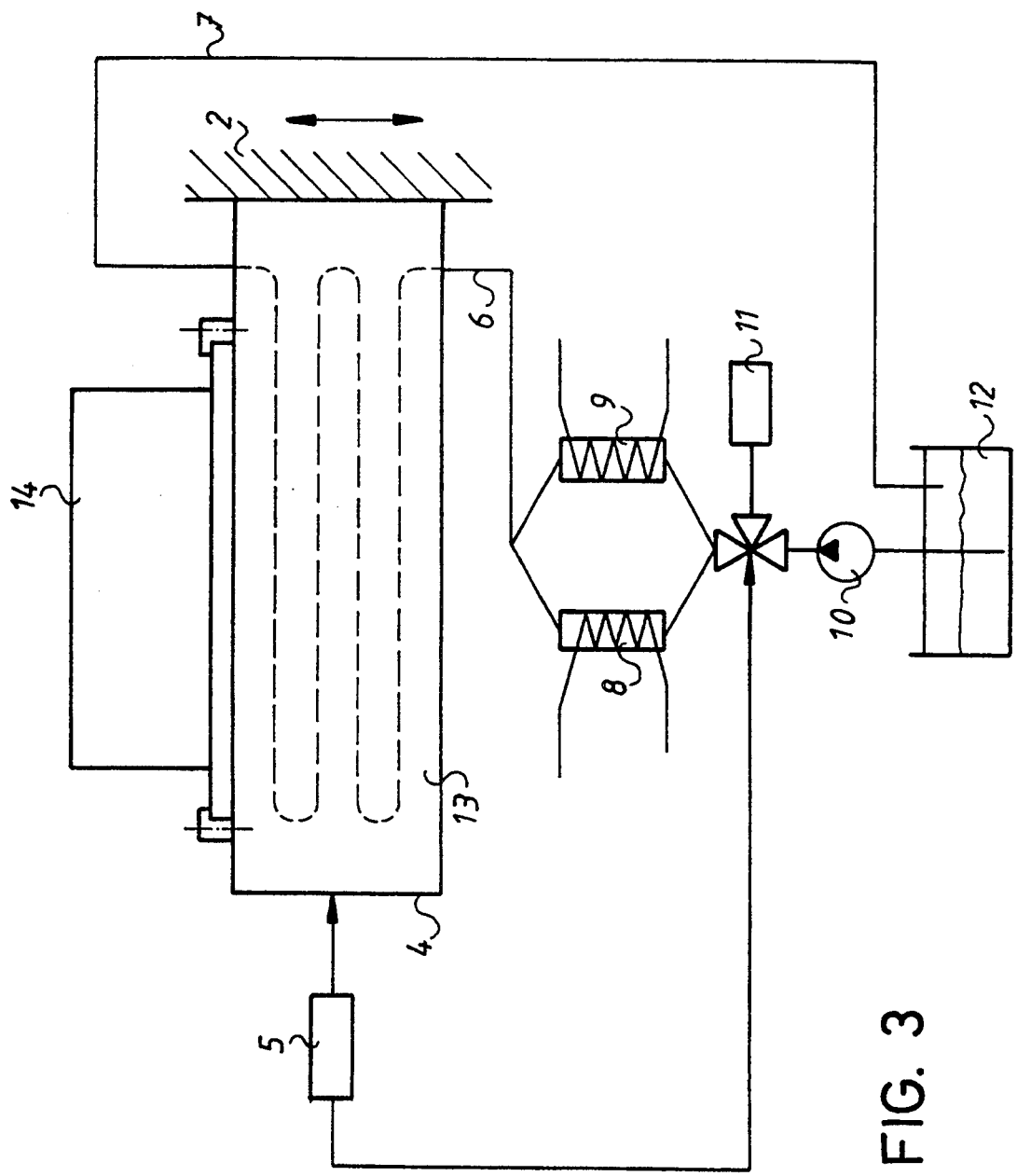
FIG. 3 is a diagrammatic view of another embodiment of cooling fluid circuit according to the invention.

FIG. 2 is a cross sectional view showing schematically a thread-guide cylinder 1 whose position is maintained by a fixed bearing 2 and a free bearing 3. The measurement of the position will be done on the side of the free bearing 3, on a free surface 4, by means of a position detector 5. The system is provided with an internal circulation of a temperature regulating fluid with an inlet 6 and an outlet 7. The position detector 5 will thus act on the flow rate or the temperature of the temperature regulating fluid. FIG. 3 represents a bloc diagram showing another way to realize the circuit. In this case, the part to be positioned is the frame support of ingot 14. The table has an embedding 2 capable of moving itself vertically and a free side with a free surface 4 perpendicularly to which a position detector without contact is measuring. This detector will act on a motorized three-way valve 11 which will guide the regulation fluid either through a heater 8 or through cooler 9. The circulation is provided by the pump 10. A tank 12 acts as a volume buffer.

The sawing thread forming the frame tightened by the thread-guides is generally constituted of spring steel having a diameter comprised between 0.1 and 0.2 mm in order to saw blocs of hard or exotic materials (such as silicon, ceramic, components III–VI, GGG, saphire, etc.) in slices having a thickness of about 0.1 to 5 mm. The device disclosed in the present invention allows, by adding a control system as described, to cut the slices of said material with the accuracy required by the users.

Of course other types of devices may be thought of in the scope of the present invention. In fact, the aspect of controlling the position, the dilatation or the temperature of elements by a system slaved to a measurment device should be kept in mind as a way to obtain an increase of the accuracy. Thus for example, it would be possible to imagine a detection system based on a proximity measurement by capacitive or inductive effect. One can also think of an ultrasonic or optical detection or by way of a sensing device.

Concerning the regulation itself, a circulation of a fluid may be enough, the parameter could be either the temperature of that fluid or its flow rate. The system may act by heating or by cooling, or eventually a combination of both. Another possibility may be the adjusting by a compensation of the position of the bloc to be sawn thanks to a mechanical, hydraulic, pneumatic or other system.

I claim:

1. A thread sawing device comprising a frame carrying thread guide cylinders and having a thread trained about said thread guide cylinders, a support for a part to be sawed, means for moving said thread and said support toward and away from each other in one direction to saw the part supported by the support, means for detecting the relative position of the cylinders and the part to be sawed, and means responsive to the detection of said relative position to change the temperature of a portion of the device to cause thermal expansion or contraction of said part so as to maintain said relative position constant in a direction transverse to said one direction in which the thread and the support move toward and away from each other, said portion of the device whose temperature is changed being a said cylinder.

2. A device according to claim 1, in which the detection means is contactless.

3. A thread sawing device comprising a frame carrying thread guide cylinders and having a thread trained about said thread guide cylinders, a support for a part to be sawed, means for moving said thread and said support toward and away from each other in one direction to saw the part supported by the support, means for detecting the relative position of the cylinders and the part to be sawed, and means responsive to the detection of said relative position to change the temperature of a portion of the device to cause thermal expansion or contraction of said part so as to maintain said relative position constant in a direction transverse to said one direction in which the thread and the support move toward and away from each other, said means to change the temperature comprising means to circulate a heat exchange fluid through said portion and means to control the temperature of said heat exchange fluid.

4. A device according to claim 3, in which said detection means is contactless.

5. A device according to claim 3, in which said portion of the device whose temperature is changed is said support.

6. A device according to claim 3, in which said means to control the temperature of the heat exchange fluid comprises a fluid heater and a fluid cooler, and valve means for selectively sending the fluid through one of said heater and cooler.

* * * * *